June 2, 1942.　　　A. W. MORTON　　　2,284,757
PARRALAX-FREE VIEW FINDER WITH AUXILIARY LENS TURRET
Filed Oct. 18, 1939
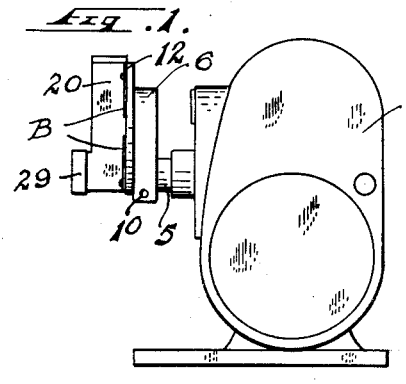
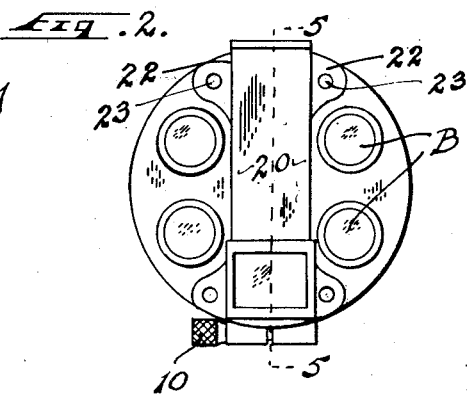
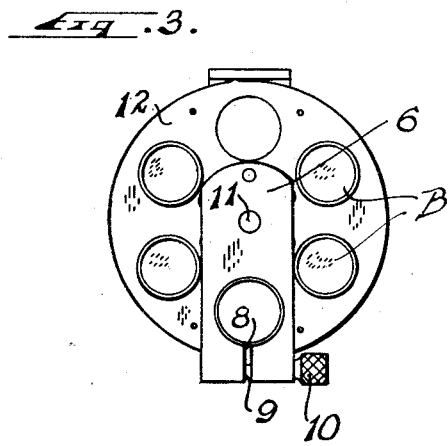
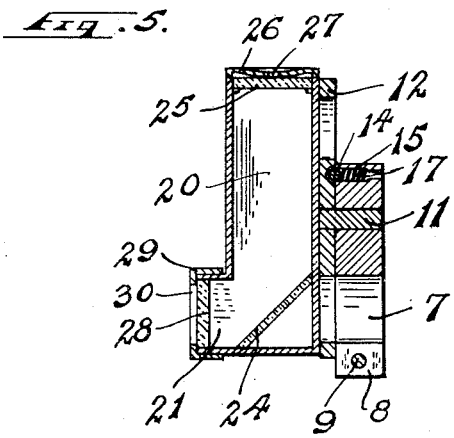
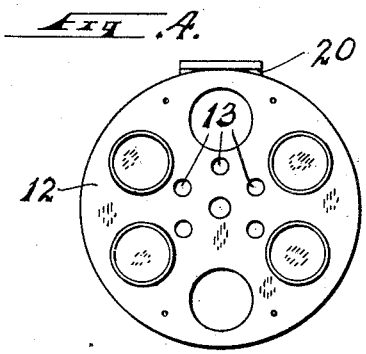
Inventor
Alton W. Morton
By
P. M. Thomas
Attorney Patented June 2, 1942

2,284,757

UNITED STATES PATENT OFFICE 2,284,757

PARALLAX-FREE VIEW FINDER WITH AUXILIARY LENS TURRET

Alton W. Morton, Salt Lake City, Utah

Application October 18, 1939, Serial No. 299,946

3 Claims. (Cl. 88—1.5)

My invention relates to motion picture cameras and more particularly to those of a size termed eight millimeter, which to date have not been provided with a viewfinder that would meet the demands of taking closeups, and has for its object to provide a turret head viewfinder for eight millimeter cameras which entirely eliminates parallax.

A still further object is to provide a viewfinder for movie cameras which combines a viewfinder in combination with the turret head, and because of the fact that the viewfinder is so positioned it has the same optical axis as the camera lens and parallax is completely eliminated.

A still further object is to provide a turret head carrying different diopter lenses adapted to be rotated into axial alignment of the camera lens in combination with a viewfinder which is also, when in use, in the same optical axis as the camera lens, and in which device after the view has been determined permits rotation of the turret head to bring any desired lens into axial alignment with the camera lens; or if desired, may leave a blank open space instead of a lens for using the camera lens alone.

These objects I accomplish with the device illustrated in the accompanying drawing in which similar numerals and letters of reference indicate like parts throughout the several views and as described in the specification forming a part of this application and pointed out in the appended claims.

In the drawing in which I have shown the best and most preferred manner of building my invention, Figure 1 shows a side elevation of the device attached to and ready for use upon a "Bell and Howell eight millimeter movie camera."

Figure 2 is a face view of my viewfinder and turret head.

Figure 3 is a reversed view of Figure 2 looking at the head from the rear.

Figure 4 is a rear view of the turret head plate removed from the standard.

Figure 5 is a vertical diametrical section on line 5—5 of Figure 2.

In the drawing, I have shown the moving picture camera as A, with the lens mount shown as a cylinder barrel 5 onto which I attach my support bracket 6. The support bracket 6 consists of a vertical column having a cylindrical bore 7 transversely through and near the lower end thereof, said bore being slotted through the bottom side of the bracket 6 at 8 with a draw or tightening bolt 9 passed through the two ends formed by the slot. A thumb screw 10 on the head of the bolt 9 is provided to adjust and draw up the sides of cylinder bore 7 onto the barrel 5 of the camera.

Medially in a vertical line through the center and near the top of the bracket 6, I provide a pivot pin or screw 11 onto which the turret plate 12 is rotatably mounted. The plate 12 is provided with an annular row of perforations spaced equidistant therearound in which holes suitable lenses B are mounted. These lenses may be mounted in the turret plate 12 in any suitable manner.

As a means to permit rotation of the turret on the bracket 6, I provide a ball lock and release mechanism comprising semi-spherical recesses 13 in the back side of the plate 12 and a spring held ball 14 carried in a bore 15 in the upper end 16 of the bracket 6 with a spring 17 normally holding tension against the ball. This tension holds the ball in one of the recesses, locking the turret plate in position. Thus, when the turret is rotated and the ball is brought into alignment with any one of the recesses 13, the turret will be temporarily locked in position, but may be manually rotated as, and when, desired.

Onto the front face of the plate 12, I provide my view finder which consists of a vertical hollow shaft 20 having the lower end 21 thereof turned outwardly at right angles with wings 22 formed on the four corners of the back side of the shaft through which screws 23 are passed to secure the view finder to the turret plate.

Diagonally across the outer right angled joint of the back end base of the view finder, I provide an angled mirror 24 held in position by suitable means and in the top of the shaft 20, I mount a lens 25 with an eye piece 26 carried thereover. The eye piece 25 has a small aperture 27 therethrough into which the person using the device looks to find the view.

On the forward end of the right angled extension 21, of the shaft 20, I mount a lens 28 with a gauge housing 29 secured thereover, holding the lens in place, with the view through the opening 30 through the housing 29, being identical to that of the exposure through the lens of the camera.

It will be obvious that modifications and variations will be necessary in the bracket 6 to adapt the mounting of this particular turret head and view finder to other types of moving picture cameras, but such modifications and variations as may be necessary for this purpose are considered within the spirit of this invention and the scope of the claims.

Having thus described my invention, I desire to secure by Letters Patent and claim:

1. A device of the class described comprising a round turret plate having an annular row of spaced apart openings therein; auxiliary lenses mounted in all but one of said openings; a hollow shaft, square in cross section, mounted diametrically across the face of said turret with the bottom end of the shaft formed at right angles and extending out in axial alignment with one of said openings; a lens mounted in the top end of said shaft and another lens mounted in the right angled end thereof; a mirror mounted on an angle across the inner juncture of the right angled end and shaft; a bracket to which the turret is rotatably mounted said bracket having one end perforated in axial alignment with the openings in the turret plate and being adapted to be secured around the tubular lens mount of the camera on which the device is installed for use.

2. A device of the class described in claim 1, including semi-oval recesses in the back side of the turret plate spaced equidistant from the axis of the plate; and a spring held ball carried in the bracket adapted to engage and frictionally hold the turret from rotation until manually rotated.

3. A device of the class described comprising a round turret plate having an annular row of spaced apart openings therein; lenses mounted in all but two diametrically opposed openings; a hollow shaft square in cross section secured onto the face of said turret plate diametrically thereacross with the bottom end of said shaft extended outwardly at right angles and in axial alignment with one of the openings which does not carry a lens; a mirror mounted on an angle across the inner juncture of the right angled bend of said shaft; a lens mounted in the top end of said shaft; a lens mounted in the outer end of the right angled end of said shaft; a bracket having a pivot hole therethrough into which a pivot pin attached to the turret is carried to mount the turret rotatably in front of the bracket and an opening in the bottom end of said bracket in alignment with the lens mount and through which the lens mount is placed with the lower end of the bracket bifurcated; a thumb screw through the end of the bracket to draw the bracket together locking it to the lens mount mounting the entire device in front of the lens of the camera on which it is used.

ALTON W. MORTON.